US011825857B2

(12) United States Patent
Al-Naquib et al.

(10) Patent No.: US 11,825,857 B2
(45) Date of Patent: Nov. 28, 2023

(54) METHOD FOR BATCH PRODUCTION OF ESPRESSO COFFEE

(71) Applicants: Zayde Al-Naquib, Hermosa Beach, CA (US); Jack Balder, Los Angeles, CA (US); Moayad Al-Naquib, Redondo Beach, CA (US)

(72) Inventors: Zayde Al-Naquib, Hermosa Beach, CA (US); Jack Balder, Los Angeles, CA (US); Moayad Al-Naquib, Redondo Beach, CA (US)

(*) Notice: Subject to any disclaimer, the term of this patent is extended or adjusted under 35 U.S.C. 154(b) by 210 days.

(21) Appl. No.: 17/507,393

(22) Filed: Oct. 21, 2021

(65) Prior Publication Data

US 2022/0117252 A1    Apr. 21, 2022

Related U.S. Application Data

(60) Provisional application No. 63/198,482, filed on Oct. 21, 2020.

(51) Int. Cl.
*A23F 5/26* (2006.01)
*A23F 5/46* (2006.01)
*A23F 5/08* (2006.01)

(52) U.S. Cl.
CPC ............... *A23F 5/26* (2013.01); *A23F 5/08* (2013.01); *A23F 5/46* (2013.01)

(58) Field of Classification Search
CPC .............. A23F 5/26; A23F 5/08; A23F 5/46
See application file for complete search history.

(56) References Cited

U.S. PATENT DOCUMENTS

| 7,032,507 | B2 | 4/2006 | Cai |
| 9,993,106 | B2 | 6/2018 | Majer |
| 2001/0000145 | A1* | 4/2001 | Kalenian ............ B01D 11/0219 |
| | | | 426/594 |
| 2019/0200798 | A1 | 7/2019 | Fleischmann |

FOREIGN PATENT DOCUMENTS

| CA | 2355663 | 4/2000 |
| CA | 2803045 | 1/2012 |
| CA | 3053423 | 8/2018 |
| CN | 102215725 B | 5/2016 |
| GB | 1024214 A | 3/1966 |
| GB | 2536094 A | 7/2016 |
| JP | 4815431 B2 | 11/2011 |
| JP | 2017123165 A | 7/2017 |
| NL | 2002722 C2 | 10/2010 |
| RU | 2479242 | 4/2013 |
| WO | WO2016054050 | 4/2016 |

* cited by examiner

*Primary Examiner* — Drew E Becker
*Assistant Examiner* — Chaim A Smith
(74) *Attorney, Agent, or Firm* — Milord A. Keshishian

(57) ABSTRACT

The present invention discloses a method for batch production of espresso coffee by preparing ground coffee and water mixture in a pressure chamber, degassing the ground coffee in the pressure chamber, extracting an initial brew from the degassed ground coffee via pressure, and producing a final brew (large batch of espresso coffee) from the initial brew.

15 Claims, 8 Drawing Sheets

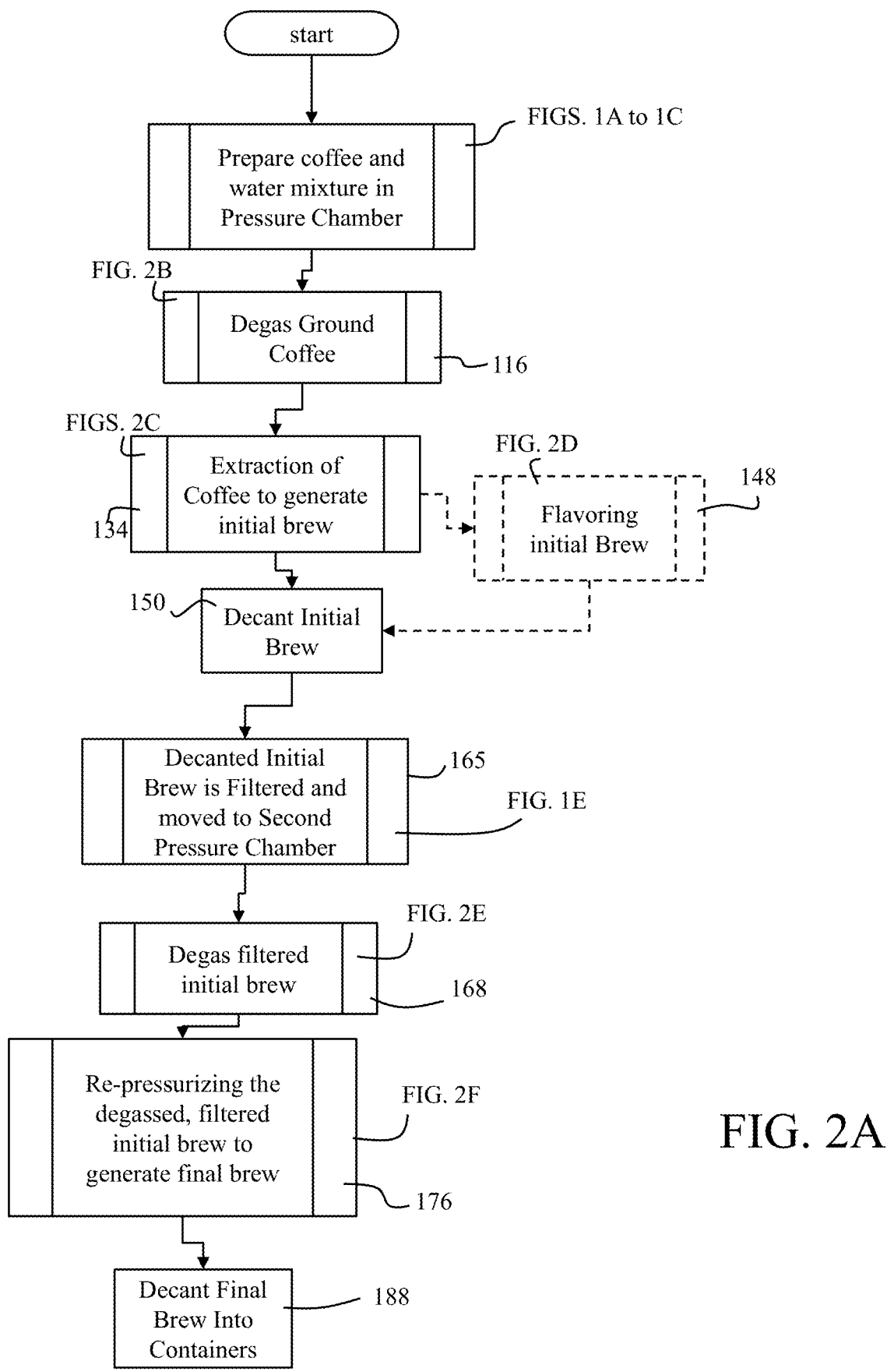

METHOD FOR BATCH PRODUCTION OF ESPRESSO COFFEE

CROSS-REFERENCE TO RELATED APPLICATIONS

This Application claims the benefit of priority of U.S. Utility Provisional Patent Application 63/198,482 filed Oct. 21, 2020, the entire disclosure of which is expressly incorporated by reference in its entirety herein.

All documents mentioned in this specification are herein incorporated by reference to the same extent as if each individual document was specifically and individually indicated to be incorporated by reference.

It should be noted that throughout the disclosure, where a definition or use of a term in any incorporated document(s) is inconsistent or contrary to the definition of that term provided herein, the definition of that term provided herein applies and the definition of that term in the incorporated document(s) does not apply.

BACKGROUND OF THE INVENTION

Field of the Invention

One or more embodiments of the present invention relate to a method for batch production of espresso coffee.

Description of Related Art

Conventional methods for making espresso coffee are well known and have been in use for a number of years. Most espresso coffee is made using complex espresso machines that are extremely costly to purchase, maintain, and operate.

In general, highly skilled and experienced baristas are needed to operate espresso machines to produce espresso coffee, and highly specialized technicians are needed to maintain them.

The steps required in producing a "shot of espresso" using espresso-machines are well known and documented, but are complex, inefficient, time-consuming, labor intensive, and generate waste. The required steps in producing espresso coffee using espresso machines are also ambient dependent—moisture, temperature, humidity, or pressure, all of which easily impact the final taste, aroma, look, and texture of the finally extracted espresso coffee. Further, the required conventional processing steps are also very much prone to human errors that introduce inconsistency that negatively impact taste, aroma, look, and texture of the finally extracted espresso coffee. In fact, a primary reason consistency is difficult to achieve is the flow rate of high-pressure water through a bed of coffee in a short duration of time. High pressure flow rate of water in combination with a short duration is the cause for multiple variables that negatively impact espresso coffee and in fact, amplify inconsistencies.

Finally, despite all drawbacks, conventional methods for making espresso coffee brew a very small amount of espresso coffee. That is, espresso coffee is commonly expected to be brewed quickly and individually, one individual serving at a time.

The steps of grinding roasted coffee for espresso coffee for example, require the use of freshly ground coffee of particular size particulates (or coffee grinds) that must be used fairly immediately to avoid negative effects of ambient conditions on the coffee grinds.

As is well known, humidity, moisture, temperature, pressure, etc. will impact the physical properties of the finally ground coffee, even within a very short time-period of about one to two hours.

As a specific example, high humidity or moisture may swell coffee grind sizes whereas a dry and cold environment may actually shrink the coffee grind size. Unwanted or unintended variations in coffee grind size adversely impact the espresso coffee brewing process and the final taste, aroma, look, and texture of the espresso coffee.

Further, the coffee grinder machine itself must be recalibrated in terms of grind size commensurate with ambient conditions. The recalibration process of the coffee grinder machine for proper grind size setting based on ambient conditions is a tedious and iterative process, requiring an experienced barista.

Recalibration generally includes purging and actual grinding and extraction of finally brewed espresso to properly determine the correct setting of the grind size of the coffee grinder machine based on the taste, aroma, look, and texture of the espresso coffee brewed as a result of ambient conditions. Recalibration also leads to further water waste, given that water needs to be used to clean and regulate the temperature of the group head of an espresso machine before and after each extraction of espresso.

More specifically, recalibration requires purging of coffee grinds with a first size from within the coffee grinder itself before using a new grind size coffee in the extraction process for the recalibration. For example, after first extraction, once the grind size is readjusted, the coffee grinder must be purged of any coffee grind of size belonging to the previous iteration to avoid mixture of two grind sizes. This step alone generates large waste of freshly ground coffee.

Once undesired coffee grind size is purged, the newly ground coffee with the newly adjusted size is used in the extraction process for recalibration of the grinder. The entire process (including purging) is repeated several times until the proper size grind is achieved, resulting in desired taste, aroma, look, and texture of the espresso coffee.

Accordingly, the grinding steps for conventional methods for making espresso coffee are required to produce only small, limited quantities of ground coffee to facilitate in somehow reducing waste, despite the fact that the grinding steps are complex, time consuming, labor intensive, and wasteful. However, production of small quantities of ground coffee to somehow reduce waste means that the complex, time consuming, labor intensive, and wasteful steps of grinding coffee (and iterative recalibrations) are repeated several times per day to meet demand.

It should be noted that the above issues with respect to grinding steps are compounded when multiple grinders are used for different types of coffees, with each having their respective complex, time consuming, labor intensive, and wasteful iterative steps of grinding coffee (and iterative recalibrations).

The step of tamping ground coffee in an espresso portafilter is yet another example of an inefficient, time-consuming, and labor-intensive process included in espresso coffee brewing methodology. Tamping involves even distribution, leveling, and uniform compaction (compression) at a certain threshold pressure (e.g., at 20 kg/cm² of pressure) of ground coffee to uniformly remove any air pockets trapped within coffee, resulting in the "coffee puck" ready for brewing.

Bad distribution and compaction of ground coffee that is not even, leveled, or uniformly compact within portafilter might lead to channeling, over extraction, under extraction, or uneven (inconsistent) extraction of brewed espresso due to a variety of reasons. For example, due to water flowing through the least resistive paths through the unevenly distributed, unevenly leveled, or unevenly or non-uniformly compacted coffee in the portafilter may result in a "watery" brewed espresso coffee.

On the other hand, even if the ground coffee in an espresso portafilter is perfectly even, leveled, and uniformly compact, using too much compaction pressure when tamping may result in a brewed espresso extraction that may be too viscous (or too thick) or using too little compaction pressure when tamping may result in a brewed espresso extraction that may be watery. Accordingly, as with grinding coffee, tamping coffee also introduces a large number of variables or inconsistencies that negatively impact extraction process, including desired taste, aroma, look, and texture of the final espresso coffee.

Accordingly, in light of the current state of the art and the drawbacks to current espresso-based machines and espresso-based coffee brewing methodologies thereof mentioned above, a need exists for methodologies for producing espresso coffee that would completely eliminate the requirement, need, or use for an espresso machine and hence, completely eliminate any associated operational issues, such as tamping. Further, a need exists for methodologies for producing espresso coffee that would substantially eliminate waste of freshly ground coffee during grinding process. Finally, a need exists for methodologies for producing espresso coffee that would enable batch production of large quantities of espresso coffee with limited water and power usage.

BRIEF SUMMARY OF THE INVENTION

A non-limiting, exemplary aspect of an embodiment of the present invention provides a method for batch production of espresso coffee, comprising:
preparing ground coffee and water mixture in a pressure chamber;
degassing the ground coffee in the pressure chamber;
extracting an initial brew from the degassed ground coffee via pressure;
filtering the initial brew; and
repressurizing the filtered initial brew to generate final brew.

Another non-limiting, exemplary aspect of an embodiment of the present invention provides a method for batch production of espresso coffee, comprising:
preparing ground coffee and water mixture in a pressure chamber;
degassing the ground coffee in the pressure chamber;
extracting an initial brew from the degassed ground coffee using a first inert gas to pressurize the pressure chamber;
filtering the initial brew; and
repressurizing the pressure chamber using second inert gas to generate final brew from the filtered initial brew.

Still another non-limiting, exemplary aspect of an embodiment of the present invention provides a method for batch production of espresso coffee, comprising:
preparing ground coffee and water mixture in a pressure chamber;
degassing the ground coffee in the pressure chamber by pressurizing the pressure chamber with a first gas;
extracting an initial brew from the degassed ground coffee by pressurizing the pressure chamber with a second gas;
flavoring the initial brew to generate a flavored initial brew by pressurizing the pressure chamber with a third gas;
filtering the flavored initial brew; and
producing a final brew from the filtered, flavored initial brew by pressurizing the pressure chamber with a fourth gas.

A further non-limiting, exemplary aspect of an embodiment of the present invention provides a method for batch production of espresso coffee, comprising:
preparing ground coffee and water mixture in a pressure chamber;
degassing the ground coffee in the pressure chamber;
extracting an initial brew from the degassed ground coffee via pressure; and
producing a final brew from the initial brew.

These and other features and aspects of the invention will be apparent to those skilled in the art from the following detailed description of preferred non-limiting exemplary embodiments, taken together with the drawings and the claims that follow.

BRIEF DESCRIPTION OF THE DRAWINGS

It is to be understood that the drawings are to be used for the purposes of exemplary illustration only and not as a definition of the limits of the invention. Throughout the disclosure, the word "exemplary" may be used to mean "serving as an example, instance, or illustration," but the absence of the term "exemplary" does not denote a limiting embodiment. Any embodiment described as "exemplary" is not necessarily to be construed as preferred or advantageous over other embodiments. In the drawings, like reference character(s) present corresponding part(s) throughout.

FIGS. 2A to 2F are non-limiting, exemplary flowchart illustration of the method operations for batch production of espresso coffee shown in FIGS. 1A to 1F in accordance with one or more embodiments of the present invention;

DETAILED DESCRIPTION OF THE INVENTION

Figure 1A:
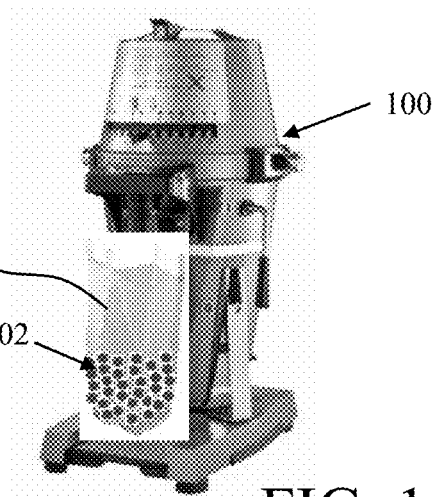
FIGS. 1A to 1F are non-limiting, exemplary schematic illustration of a method for batch production of espresso coffee in accordance with one or more embodiments of the present invention.

The detailed description set forth below in connection with the appended drawings is intended as a description of presently preferred embodiments of the invention and is not intended to represent the only forms in which the present invention may be constructed and or utilized.

It is to be appreciated that certain features of the invention, which are, for clarity, described in the context of separate embodiments, may also be provided in combination in a single embodiment. Conversely, various features of the invention that are, for brevity, described in the context of a single embodiment may also be provided separately or in any suitable sub-combination or as suitable in any other described embodiment of the invention. Stated otherwise, although the invention is described below in terms of various exemplary embodiments and implementations, it should be understood that the various features and aspects described in one or more of the individual embodiments are not limited in their applicability to the particular embodiment with which they are described, but instead can be applied, alone or in various combinations, to one or more of the other embodiments of the invention.

For purposes of illustration, method operations or functions or acts are illustrated herein as discrete blocks, where each block within a flowchart may represent both method function(s), operation(s), or act(s) and or one or more elements for performing the method function(s), operation(s), or act(s).

Additionally, all pressures, times (durations), and batch size of final espresso coffee brew disclosed throughout the disclosure are merely non-limiting examples and are used based on the pressure chamber size and pressure rating of the pressure chamber used. For higher pressure rated pressure chambers, higher pressures (e.g., 150 PSI) may be used, which, in turn, would decrease the amount of time needed for the overall extraction process. In general, use of generally higher pressures and temperatures at a generally longer durations tend to produce espresso coffee with a greater amount of crema.

One or more embodiments of the present invention provide methodologies for producing espresso coffee that completely eliminate the requirement, need, or use for an espresso machine and hence, completely eliminate any associated operational issues, including variables associated with flow rate.

Further, one or more embodiments of the present invention provide methodologies for producing espresso coffee that eliminates waste of freshly ground coffee during the grinding process.

Additionally, one or more embodiments of the present invention produce espresso coffee in batch production of large quantities of espresso coffee.

FIGS. 1A to 1F are non-limiting, exemplary schematic illustrations of a method for batch production of espresso coffee in accordance with one or more embodiments of the present invention. FIGS. 2A to 2F are non-limiting, exemplary flowchart illustrations of the method operations for batch production of espresso coffee shown in FIGS. 1A to 1F.

First operational act in the process for batch production of espresso coffee is to start with roasted coffee beans.

Optionally, it is preferred to wait a few days (about 1 to 2 days) post-roast to allow for off-gassing of $CO_2$ and brew within 3-4 weeks of its roast date. It has been found that after that period the roasted coffee will begin to lose much of its aromatics and best attributes as a result of oxidation.

As best illustrated in FIG. 1A, as part of the process for batch production of espresso coffee, roasted coffee beans are ground to a selected size. That is, the roasted coffee beans are ground at one or more grind size to form ground coffee having one or more coffee particle granulation size.

The present invention may use either a single grind size or multiple grind size coffee to produce espresso coffee. As detailed below, use of a single grind size or multiple grind sizes is a matter of taste and hence, the present invention is not limited to either and may use single or multiple grind sizes.

The use of a single grind size results in a more even hydration, diffusion, quicker saturation, and greater extraction of coffee grinds of the same size during batch production. Further, use of single size granulation results in a more even extraction of brewed coffee, eliminating potential over extraction, under extraction, or uneven (inconsistent) extraction of brewed espresso. Accordingly, use of a single grind size results in more uniform taste, aroma, look, and texture of the final espresso coffee, without any off tastes. That is, the flavors of a final espresso coffee from a single grind size are more defined (or dominant) since only a single grind size is used (similar to pure orange juice with no added sugar, colors, or flavors where the taste of orange is dominant).

The use of multiple grind sizes on the other hand, are impacted differently during production and hence, provide a less defined, less dominant "single flavor." For example, use of multiple size granulation results in a more uneven extraction of brewed coffee, which may potentially result in over extraction, under extraction, or uneven (inconsistent) extraction of brewed espresso. Accordingly, use of a multi grind sizes results in a non-uniform taste, aroma, look, and texture of the final espresso coffee, with some off-taste effects, making the main taste less defined and less dominant. As an example, this would be similar to pure orange juice with added flavors, sugar, etc., making the true taste of real orange in the juice less defined and less dominant.

In the non-limiting, exemplary instance shown in FIG. 1A, the present invention uses a well-known, conventional Unimodal grinder 100, with ground coffee 102 having a single, uniform grind size of about 300 to 500 microns, preferably about 400 microns. Grind sizes provided are approximations as there will be variability between different coffees, grinders, and total brew times. It should be noted that any grind size may be used however, the larger the grind size, the slower the rate of extraction. Additionally, grind size also impacts the overall taste of the final espresso coffee. Further, coarser grind sizes and longer brew times reduce opportunity for variability and inconsistency between batch extractions.

The dose of roasted coffee beans to be ground depends on the amount of finally brewed espresso batch size needed. For example, the present invention may grind 2 Kg of roasted coffee beans at once, whereas for conventional espresso, only a mere 14 g to 21 g of roasted coffee beans are ground for an individual serving.

It should be noted that since the entirety of the batch is ground at once, this ensures that there is no coffee wasted in the preparation of batch espresso coffee. For best practices, it is preferred to use as large of a burr size grinder as possible since the larger the burr set, the more evenly extracted the final batch of ground coffee 102.

Figure 1B:
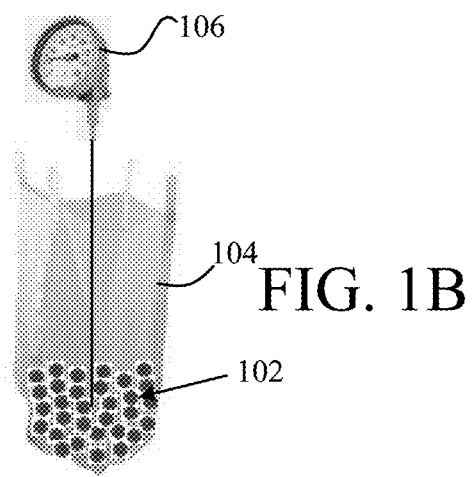

As further illustrated in FIGS. 1A and 1B, the roasted coffee beans may be ground directly into a nylon mesh filter bag 104. Nylon mesh filter bag 104 is well known and conventional—the mesh opening sizes may range from 120 microns to 250 microns.

Optionally, for best practice, temperature $T_{GC}$ of the ground coffee 102 inside the nylon mesh filter bag 104 may be measured using a temperature sensor 106. In general, the grinding process adds heat to ground coffee 102. Accordingly, temperature $T_{GC}$ of ground coffee 102 is measured to determine the appropriate water temperature $T_W$ to be used during brewing process so to achieve a generally, overall desired brewing temperature $T_B$, for example, of about 75 F to 140 F, preferably, above 100 F. For example, assuming that brewing requires an overall temperature $T_B$, if the temperature $T_{GC}$ of the ground coffee 102 is measured to be too high, then the water temperature $T_W$ input into pressure chamber 108 must be lower than $T_B$ so that the overall brewing temperature ($T_B=T_{GC}+T_W$) is achieved. On the other hand, if the temperature $T_{GC}$ of ground coffee 102 is too low, then the water temperature $T_W$ input into pressure chamber must be higher than $T_B$ so that an overall brewing temperature $T_B$ is achieved.

A brewing temperature $T_B$ of about 75 F to 140 F may be used, and preferably above 100 F. The present invention has recognized that brewing temperature $T_B$ above 100 F creates crema with more stable oils and increased production of volatile aromatic compounds, all of which are more desirable. However, any brewing temperature $T_B$ may be used during extraction process since the entire extraction process (as detailed below) is pressure-based, this even includes cold-brewing. Of course, the extraction time must be modified in accordance with the selected brewing temperature $T_B$. The lower the brewing temperature $T_B$, the longer the extraction time must be, and the higher the brewing temperature $T_B$, the shorter the extraction time. Selecting the appropriate extraction time based on brewing temperature $T_B$ results in espresso coffee and its crema with the desired taste, texture, aroma, and look.

Figure 1C:
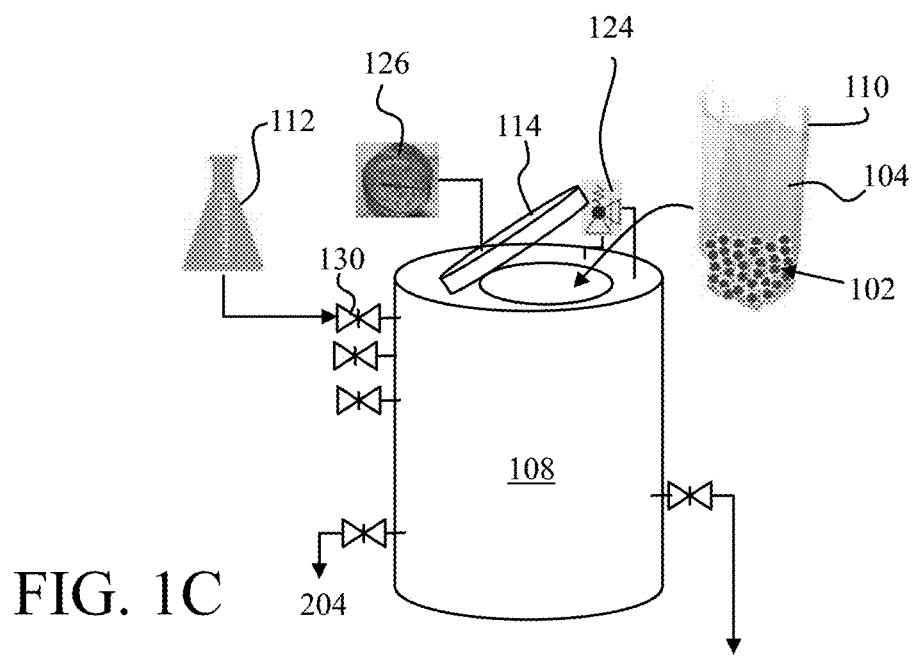

As best illustrated in FIG. 1C, nylon mesh filter bag 104 with ground coffee 102 therein is first closed off and sealed at the top end 110 to secure all ground coffee 102 within, then placed inside pressure chamber 108. More specifically, pressure chamber lid 114 may be opened, and then closed off and sealed nylon mesh filter bag 104 with ground coffee 102 therein placed inside the pressure chamber 108.

It is preferred with ground coffee 102 to have the extraction and brewing process commence immediately after the grinding process shown in FIG. 1A. Grinding coffee 102 in operation FIG. 1A release $CO_2$ that was captured inside the coffee beans during roasting. Accordingly, ground coffee 102 should be brewed immediately prior to further off-gassing of $CO_2$. As is well known, $CO_2$ is one of the compounds that very much contributes in generating crema in an espresso coffee.

Figure 1D:
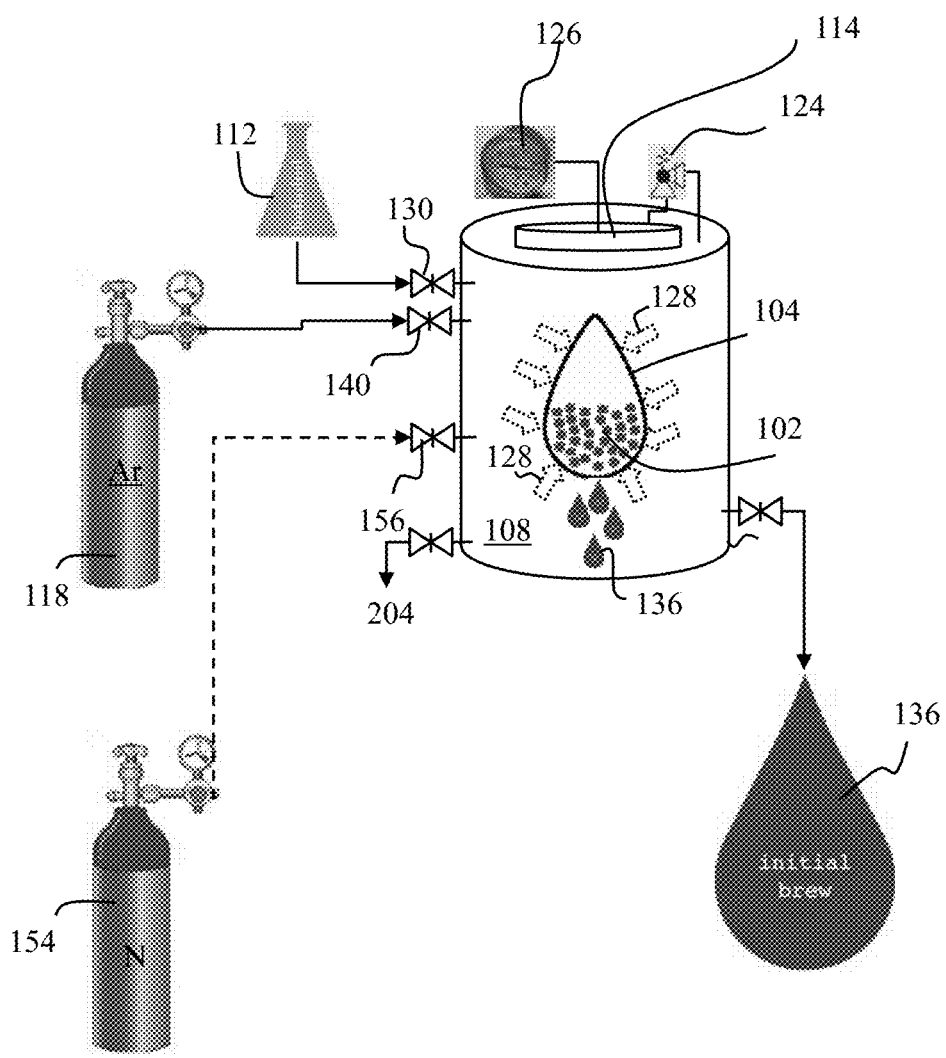

Once positioned inside pressure chamber 108, water 112 may be added, allowing the entire nylon mesh filter bag 104 with ground coffee 102 therein to float inside first pressure chamber 108 (best shown in FIG. 1D). Ground coffee 102 is therefore in suspension in water during the entire first extraction/brewing process within pressure chamber 108—similar to a "teabag" floating in a cup of water. It should be noted that water may be added to nylon mesh filter bag 104 while inside pressure chamber 108, and then sealed off.

It should be noted that water 112 may be added at selected temperature Tw and a selected flow rate pressure (about 30 to 45 PSI). The selected flow rate pressure of water 112 will agitate ground coffee 102 floating inside nylon mesh filter bag 104 in water 112 to thereby facilitate a more uniform, faster extraction.

In general, the ratio of coffee to water for the brew should be about 1 g of coffee to 3.85 g of water (1:3.85)—this may vary depending on the desired strength of the espresso coffee. Given that the coffee to water ratios used are similar to an individual cup of espresso coffee, a minimum 100× increase in dose size also leads to minimum 100× increase in servings. That number increase continues to correlate with batch size increase. It is widely accepted that between 80-140 PPM of minerals in filtered water represents an ideal range with which to brew espresso coffee. However, other PPM water may be used if desired, but will likely impact rate of extraction and taste of espresso coffee.

Once water 112 is added via inlet port valve 130 to pressure chamber 108 with ground coffee 102 therein, chamber lid 114 of pressure chamber 108 may be closed to start the first extraction process as shown in FIG. 1D, with flowcharts 2A to 2C illustrating the method operations. None of the operations shown in FIGS. 2A to 2F require electrical power.

As illustrated, at operation 116, ground coffee 102 within pressure chamber 108 is degassed. This operation removes all oxygen from ground coffee 102, facilitating in the removal of off-flavors from the final brew due to presence of oxygen. In other words, this process allows for an extraction that prevents the release of volatile aromatic compounds and odorant molecules until exposed to oxygen, as well as reducing unpleasant tastes introduced through the presence of Oxygen. Removing oxygen increases shelf-life of the final batch brewed as there would be no oxygen to oxidize the final product.

As detailed below in relation to FIG. 2B, an inert gas 118 such as Argon (Ar) when introduced into pressure chamber 108 via an inlet port valve 140 displaces all other gases, including oxygen from pressure chamber 108 (and ground coffee 102 therein).

Figure 2B:
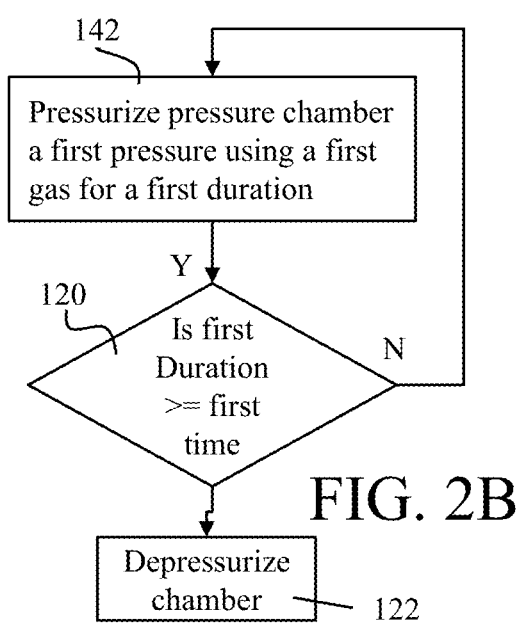

As detailed in FIG. 2B, operation 116 of degassing ground coffee 102 is comprised of operation 142, which is pressurizing pressure chamber 108 up to a first pressure using a first gas for a first duration. In this non-limiting, exemplary instance at operation 142, using pressure gauge 126, pressure chamber 108 is pressurized at 5 to 15 PSI using argon Ar gas 118 for a duration time of about 1 to 5 minutes. At this stage, both water 112 and ground coffee 102 inside nylon mesh filter bag 104 experience pressure (symbolized by the illustrated dashed lined arrows 128) of about 5 to 15 PSI.

Upon completion of the first duration time determined at operation 120, thereafter, at operation 122 pressure chamber 108 is depressurized, which creates a vacuum inside pressure chamber 108. At this stage, all gases (including Argon) are released from chamber, creating a vacuum therein with no gases. Only water and coffee remain in pressure chamber 108. Pressure chamber 108 may be depressurized using a pressure relief valve 124.

Figure 2D:
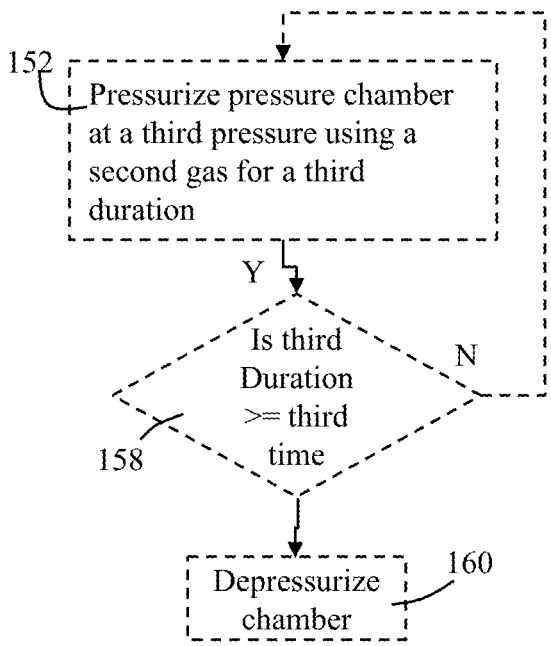
Figure 2C:
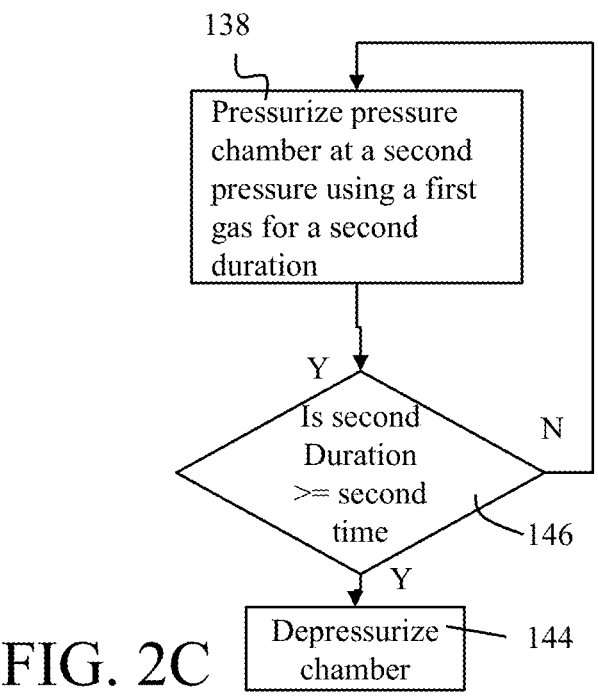

Referring back to FIG. 2A, upon completion of operations 116 of degassing of ground coffee 102, extraction of degassed ground coffee takes place at operation 134 to generate a batch of initial brew 136, the details of which are shown in FIG. 2C.

As detailed in FIG. 2C, operation 134 is the extraction of degassed ground coffee to generate a batch of initial brew 136. The extraction 134 includes operation of 138 of pressurizing first pressure chamber 108 at a second pressure using a first gas for a second duration, and depressurizing first pressure chamber 108 at operation 144.

In this non-limiting, exemplary instance for example, first pressure chamber 108 may be pressurized at a second pressure of about 27 to 30 PSI using Argon gas 118 for a duration of about 1 to 2.5 hours at operation 138. At this stage, ground coffee 102 experiences pressure 128 of about 27 to 30 PSI of Argon gas 118. Additionally, pressure chamber 108 now includes water, coffee, and Argon gas with no other gases.

During operations 134 the brew temperature $T_B$ is gradually reduced due to heat dissipation from pressure chamber 108. This gradual reduction of brew temperature $T_B$ during operation 134 prevents generation of unwanted bitter compounds. Accordingly, gradual reduction of brew temperature $T_B$ during operation 134 as time passes and heat dissipates results in a batch of initial brew 136 that is "sweeter" in taste.

As indicated above, first pressure chamber 108 may be pressurized at a much higher pressure 128, for example, at 150 PSI, depending on the pressure rating of the chamber. Use of higher pressures means faster overall brew time.

Once desired pressure is reached, Argon gas 118 is shut off via inlet valve 140. Thereafter, at operation 144, pressure chamber 108 is depressurized using pressure relief valve 124. At this stage, all gases (including Argon 118) are released from pressure chamber 108, creating a vacuum therein with no gases. The pressure chamber 108 now includes a batch of initial brew 136. It should be noted that at this stage of operation 134, a user may use a taste port 204 of pressure chamber 108 to sample the batch of initial brew 136. Taste port 204 may comprise of a simple one-way valve for allowing egress of initial brew but preventing ingress of matter (especially air or other gases) into pressure chamber 108.

Referring back to FIG. 2A, batch of initial brew 136 may be decanted at operation 150 from pressure chamber 108 for further processing. At this stage, batch of initial brew 136 has a pure, unadulterated taste, aroma, look, and texture of an espresso. However, most general public are not used to this pure taste and hence, the optional flavoring operation 148 detailed in FIG. 2D is carried out to allow for introduction of variables in the pure taste of batch of initial brew 136 to make it more palatable (acceptable) to the general public.

FIG. 2D is a non-limiting, exemplary detailed flow illustration of the flavoring operations 148. As illustrated in FIG. 2D, at operation 152, first pressure chamber 108 is pressurized at a third pressure using a second gas for a third duration. This step adds a "creamy quality" and flavoring to batch of initial brew 136. Thereafter, first chamber 108 is depressurized.

In this non-limiting, exemplary instance for example, first pressure chamber 108 may be pressurized at a third pressure of about 15 to 30 PSI using Nitrogen ($N_2$) gas 154 via inlet port valve 156 for a duration of about 10 to 45 minutes at operation 152. At this stage, pressure chamber 108 includes water, coffee, and nitrogen gas 154 with no other gases. Upon completion of the duration determined at operation 158, first chamber 108 is depressurized using pressure relief valve 124. At this stage, all gases (including Nitrogen 154) are released from pressure chamber 108, creating a vacuum therein with no gases.

It should be noted that if flavoring operation 148 is not performed, then all of its time period (e.g., 10 to 45 minutes for the given pressure of 15 to 30 PSI) is added to the extraction operation 134. In other words, the third duration of time in operation 152 would be added to the second duration of time in operation 138.

Figure 1E:
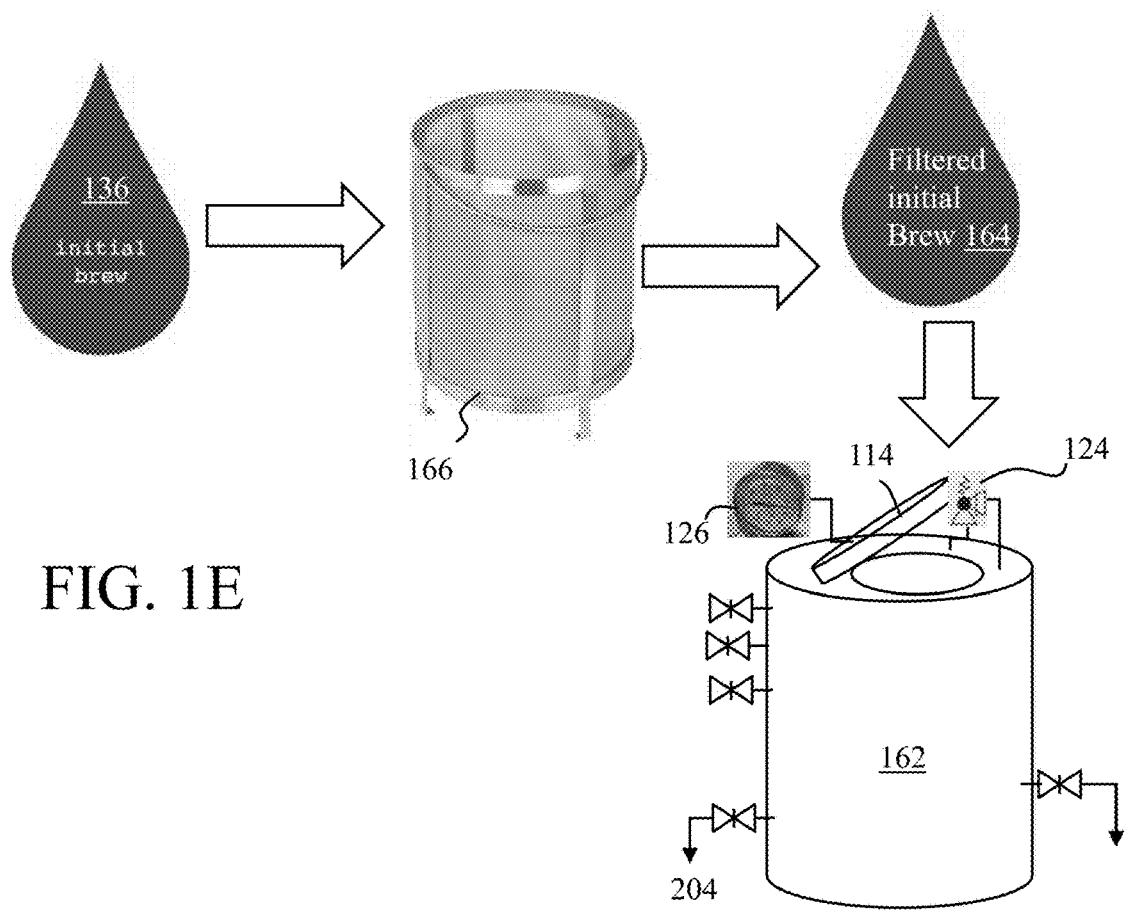

Referring back to FIG. 2A, whether flavoring operation 148 is carried out or not, batch of initial brew 136 is decanted (at operation 150) and thereafter, filtered and moved to second pressure chamber 162, as indicated in operation 165 (shown in FIG. 1E).

As illustrated in FIG. 1E, decanted batch of initial brew 136 is filtered, resulting in a batch of filtered initial brew 164. Batch of initial brew 136 is filtered through 60-to-80-micron filter mesh 166, depending on the oil production or thickness of crema desired. Secondary filtration further removes any finer coffee grinds (greater than 60 to 80 microns) and extra oils produced due to extraction. As further shown in FIG. 1E, the batch of filtered initial brew 164 is moved into a second pressure chamber 162. In this non-limiting, exemplary instance shown, the batch of brew 164 is directly poured into second pressure chamber 162.

Figure 1F:
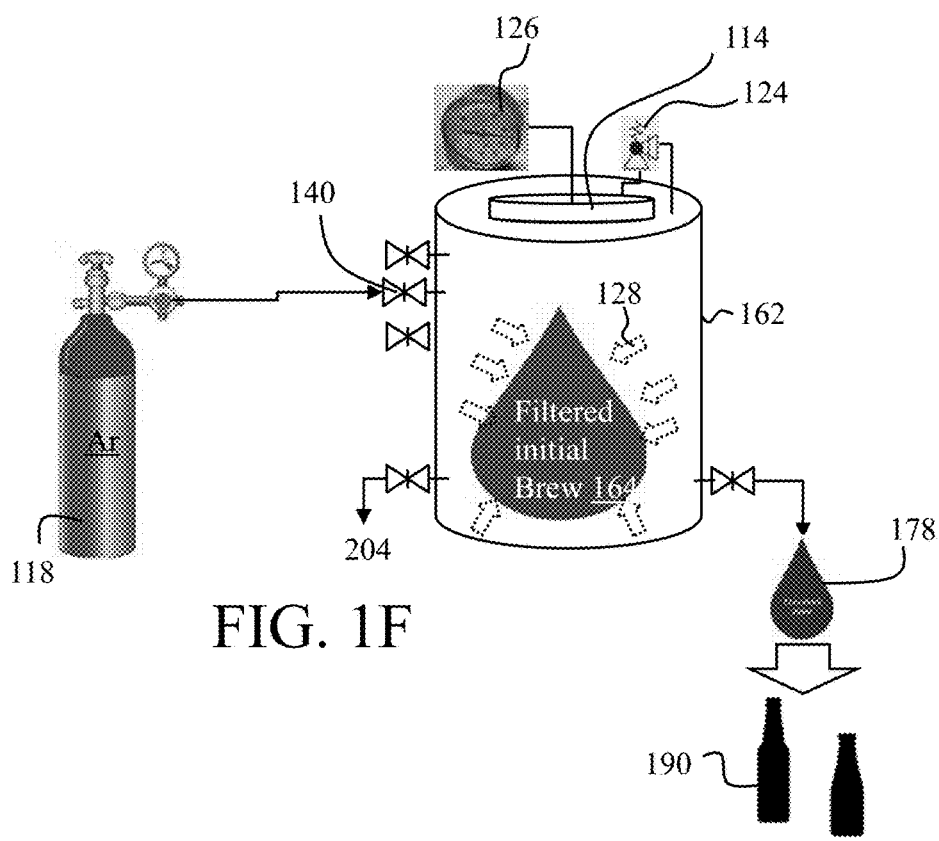
Figure 2E:
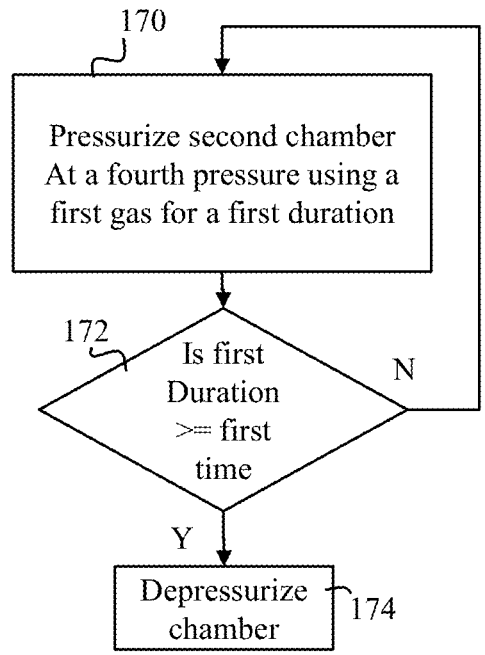

Referring back to FIG. 2A, at operation 168, batch of filtered initial brew 164 is degassed, the detail of which are in flowchart of FIG. 2E and schematically illustrated in FIG. 1F. As shown in FIG. 2E, degassing operation 168 of batch of filtered initial brew 164 includes pressurizing second pressure chamber 162 at a fourth pressure using a first gas for a first duration at operation 170, and after first duration of time (operation 172), depressurizing second pressure chamber 162 at operation 174.

In this non-limiting, exemplary instance at operation 170, using pressure gauge 126, pressure chamber 162 is pressurized at 5 to 15 PSI using argon Ar gas 118 for a duration time of about 1 to 5 minutes. At this stage, batch of filtered initial brew 164 experiences pressure 128 of about 5 to 15 PSI of Argon gas 118.

degassing operation 168 removes all oxygen from batch of filtered initial brew 164 introduced while decanted and exposed to ambient air, facilitating in the removal of off-flavors from the final brew due to presence of oxygen. As before, removing oxygen increases shelf-life of the final batch brewed as there would be no oxygen to oxidize the final product.

Figure 2F:
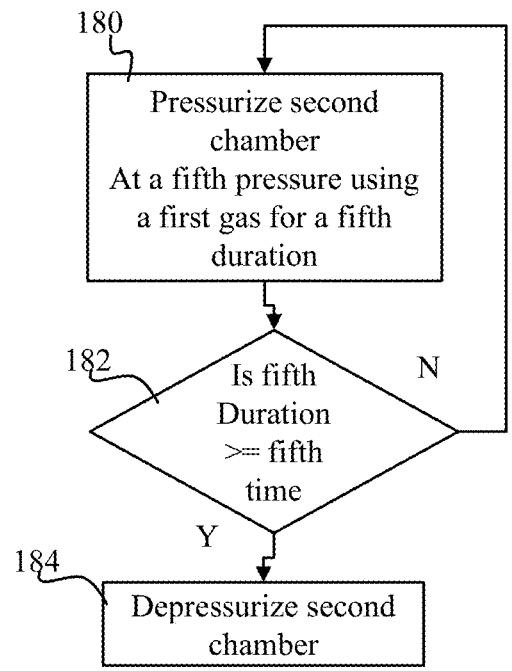

Referring back to FIG. 2A, upon completion of operations 168 of degassing of batch of filtered initial brew 164, re-pressurization of degassed, batch of filtered initial brew 164 takes place at operation 176 to generate a batch of final brew 178, the details of which are shown in FIG. 2F.

It should be noted that there are many oils produced primarily during the operations 134, and by re-pressurizing the finished liquid itself, it helps bring those oils together for a more emulsified finished brew that has a slight reduction in perceived acidity/sharpness as a result. The "Crema" will appear more viscous as well.

As detailed in FIG. 2F, operation 176 is the re-pressurization process to generate a batch of final brew 178. The re-pressurization 176 includes pressurizing second pressure chamber 162 at a fifth pressure using a first gas for a fifth duration at operation 180, and after a predetermined time (operation 182), depressurizing second pressure chamber 162 at operation 184.

In this non-limiting, exemplary instance for example, second pressure chamber 162 may be pressurized at a second pressure of about 5 to 15 PSI using Argon gas 118 for a duration of about 5 to 20 minutes at operation 180. At this stage, degassed, batch of filtered initial brew 164 experience pressure 128 of about 5 to 15 PSI of Argon gas 118. Additionally, pressure chamber 162 now includes batch of filtered initial brew 164 and Argon gas with no other gases.

Once desired pressure is reached, Argon gas 118 is shut off via inlet valve 140. Thereafter, at operation 184, pressure chamber 162 is depressurized using pressure relief valve 124. At this stage, all gases (including Argon 118) are released from pressure chamber 162, creating a vacuum therein with no gases. The pressure chamber 162 now includes batch of final brew 178, where it is decanted (operation 188) and distributed into appropriate containers (e.g., bottles) 190, ready for consumption as desired.

batch of final brew 178 is espresso coffee that may be used in a variety of ways, including consumed directly from container 190, heated/aerated in well-known manner, mixed with alcohol, etc. That is, the espresso coffee in bottle 190 may be shaken and poured into a cup, with espresso crema visible and consumed without any further steps. Alternatively, bottled espresso 190 may be heated in a microwave, may be frothed using well known froth mechanisms, or aerated/heated using any well-known steam wand machine prior to serving. The espresso coffee within bottle 190 may also be used with any other drinks (alcohol or non-alcohol based), such as an espresso-martini, use in beer brewing, or reduced in cooking applications for greater viscosity such as use of a syrup for soda. It may also be used in cooking or baking, such as in cakes, etc. just as you can use any espresso coffee or used in place for any recipe that calls for a coffee component. It could be used in non-consumable applications such as soaps or body scrubs. The spent coffee grinds from the extraction process could also be used in other applications such as composting for gardening.

Figure 3A:
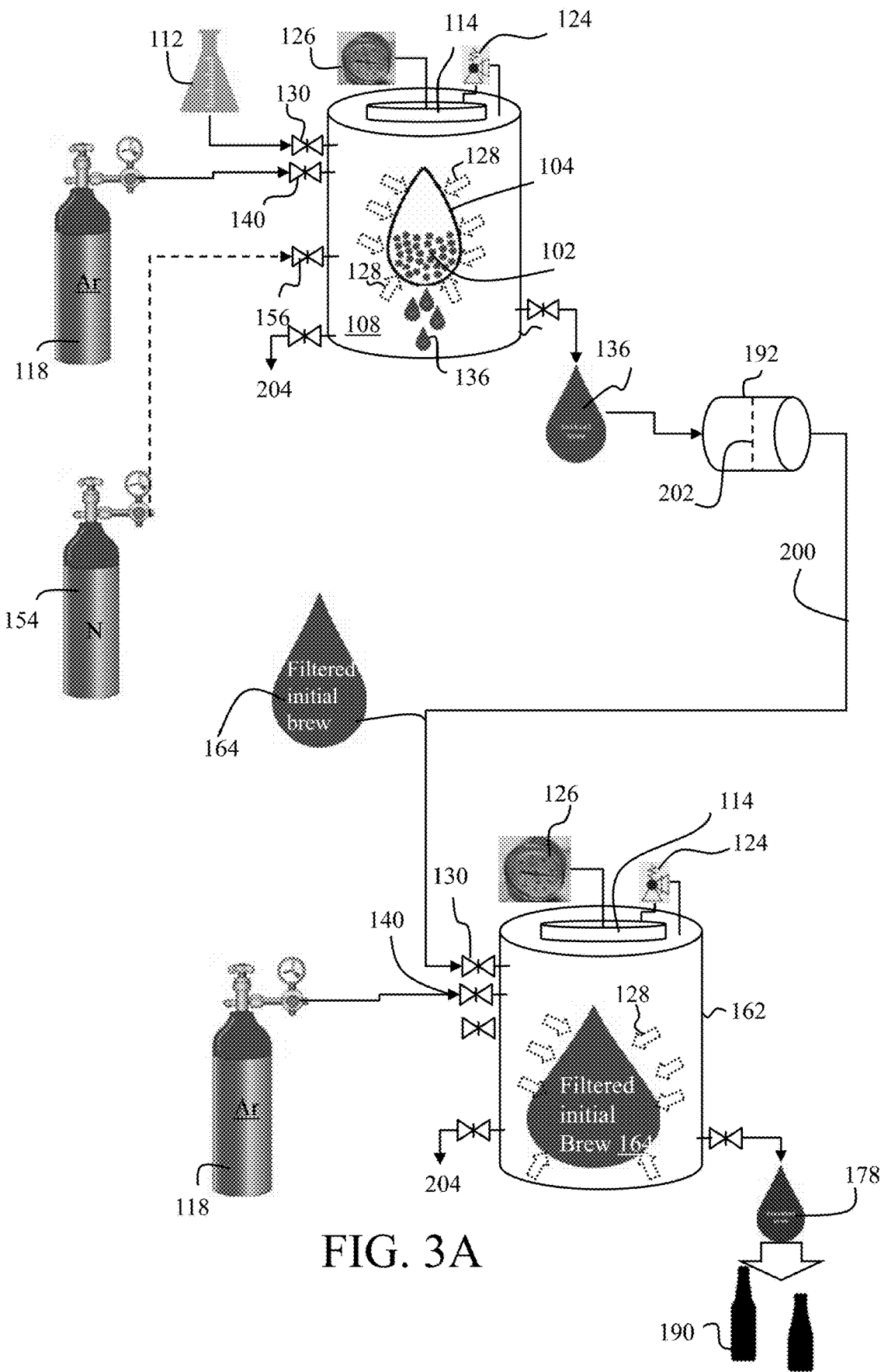
FIG. 3A is a non-limiting, exemplary illustration of a method for batch production of espresso coffee in accordance with one or more embodiments of the present invention.
Figure 3B:
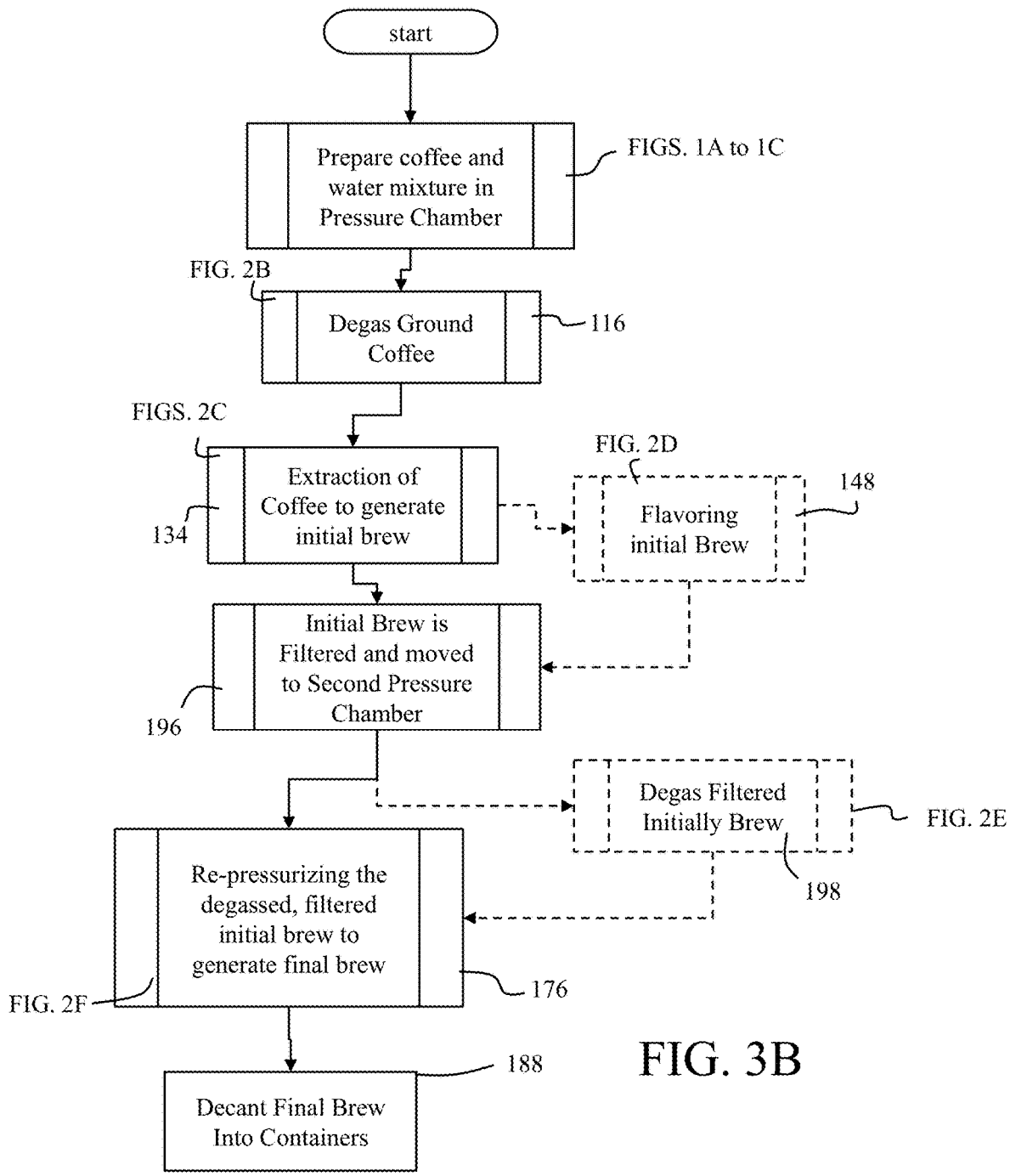
FIG. 3B is a non-limiting, exemplary flowchart illustration of the method operations for batch production of espresso coffee shown in FIG. 3A in accordance with one or more embodiments of the present invention.

FIG. 3A is non-limiting, exemplary illustrations of a method for batch production of espresso coffee in accordance with one or more embodiments of the present invention. FIG. 3B is a non-limiting, exemplary flowchart illustration of the method operations for batch production of espresso coffee shown in FIG. 3A. The methodologies illustrated in FIGS. 3A and 3B includes similar corresponding or equivalent components, methods, interconnections, functional, operational, and or cooperative relationships as the methodologies that are shown in 1A to 2F, and described above. Therefore, for the sake of brevity, clarity, convenience, and to avoid duplication, the general description of FIGS. 3A and 3B will not repeat every corresponding or equivalent component, methods, interconnections, functional, operational, and or cooperative relationships that has already been described above in relation to methods that are shown in FIGS. 1A to 2F but instead, are incorporated by reference herein.

As illustrated in FIGS. 3A and 3B, in this non-limiting, exemplary embodiment, batch of initial brew 136 is no longer decanted, but is directly piped 200 from first pressure chamber 108 to second pressure chamber 162 through secondary filter 192. Batch of initial brew 136 may be transferred via pipe or connection 200 to second pressure chamber 162 through filter 192 using any number of well-known methods, including using pressure differential of first and second chamber 108 and 162 or, alternatively, using a well-known pump. Secondary filter 192 may comprise of any well-known inline filter with 60 to 80 micron mesh 202 filtering capability.

As best shown in FIG. 3B, operations 150, 165, and 168 would no longer be needed as batch of initial brew 136 is not decanted and is not exposed to air. Instead, this non-limiting, exemplary method provides operation 196, which moves batch of initial brew 136 directly from first pressure chamber 108 to second pressure chamber 162 via filter 192, resulting in filtered, batch of initial brew 164.

The optional degassing of batch of filtered initial brew 164 indicated as operation 198 illustrated in FIG. 3B (detailed in FIG. 2E) is added to remove nitrogen ($N_2$), assuming flavoring operation 148 is carried out.

Although the invention has been described in considerable detail in language specific to structural features and or method acts, it is to be understood that the invention defined in the appended claims is not necessarily limited to the specific features or acts described. Rather, the specific features and acts are disclosed as exemplary preferred forms of implementing the claimed invention. Stated otherwise, it is to be understood that the phraseology and terminology employed herein, as well as the abstract, are for the purpose of description and should not be regarded as limiting. Further, the specification is not confined to the disclosed embodiments. Therefore, while exemplary illustrative embodiments of the invention have been described, numerous variations and alternative embodiments will occur to those skilled in the art. For example, as noted above, all pressures provided throughout the disclosure may be different if a pressure chamber of different rating of pressure capacity are used. Further, changing the pressure will also require modification in the durations at which pressure is applied. As another example, the batch sizes for the various brews, including the final brew will also vary depending on the amount of ground coffee and the commensurate size of the pressure chamber used. For example, in the above non-limiting examples, 7 Kg of coffee was used with the given parameters (detailed above), yielding 16 liters of espresso coffee. Such variations and alternate embodiments are contemplated, and can be made without departing from the spirit and scope of the invention.

It should further be noted that throughout the entire disclosure, the labels such as left, right, front, back, top, inside, outside, bottom, forward, reverse, clockwise, counter clockwise, up, down, or other similar terms such as upper, lower, aft, fore, vertical, horizontal, lateral, oblique, proximal, distal, parallel, perpendicular, transverse, longitudinal, etc. have been used for convenience purposes only and are not intended to imply any particular fixed direction, orientation, or position. Instead, they are used to reflect relative locations/positions and/or directions/orientations between various portions of an object.

In addition, reference to "first," "second," "third," and etc. members throughout the disclosure (and in particular, claims) is not used to show a serial or numerical limitation but instead is used to distinguish or identify the various members of the group.

Further the terms "a" and "an" throughout the disclosure (and in particular, claims) do not denote a limitation of quantity, but rather denote the presence of at least one of the referenced item.

The use of the phrases "and or," "and/or" throughout the specification (if any used) indicate an inclusive "or" where for example, A and or B should be interpreted as "A," "B," or both "A and B."

In addition, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of," "act of," "operation of," or "operational act of" in the claims herein is not intended to invoke the provisions of 35 U.S.C. 112, Paragraph 6.

What is claimed is:

1. A method for batch production of an espresso coffee, comprising:
    providing a pressure chamber;
    preparing a mixture of ground coffee and water in the pressure chamber;
    sealing and pressurizing the pressure chamber at a first pressure for a first duration to degas the ground coffee;
    depressurizing the pressure chamber to release gas contained therein;
    extracting an initial brew from the degassed ground coffee by repressurizing the pressure chamber;
    depressurizing the pressure chamber;
    filtering the initial brew to obtain a filtered initial brew; and
    repressurizing the filtered initial brew to generate a final brew.

2. The method for batch production of the espresso coffee as set forth in claim 1, wherein:
    preparing the ground coffee and water mixture in the pressure chamber includes:
    grinding roasted coffee beans at one or more grind size to form the ground coffee having one or more coffee particle granulation size.

3. The method for batch production of the espresso coffee as set forth in claim 2, wherein: a single grind size of one or more grind size is approximately 200 microns to 1000 microns.

4. The method for batch production of the espresso coffee as set forth in claim 1, wherein:
the ground coffee is ground directly into a mesh filter bag.

5. The method for batch production of the espresso coffee as set forth in claim 4, further comprising: measuring a temperature of the ground coffee.

6. The method for batch production of the espresso coffee as set forth in claim 4, comprising:
positioning the mesh filter bag containing the ground coffee within the pressure chamber;
adding water to the pressure chamber;
sealing the pressure chamber; and
agitating the water and mesh filter bag containing the ground coffee within the pressure chamber.

7. The method for batch production of the espresso coffee as set forth in claim 1, wherein:
extracting the initial brew from the degassed ground coffee includes pressurizing the pressure chamber at a second pressure using a first gas for a second duration; and
depressurizing the pressure chamber.

8. The method for batch production of the espresso coffee as set forth in claim 7, further comprising:
flavoring initial brew before filtration.

9. The method for batch production of the espresso coffee as set forth in claim 8, wherein:
flavoring includes pressurizing the pressure chamber at a third pressure using a second gas for a third duration; and
depressurizing the pressure chamber.

10. The method for batch production of the espresso coffee as set forth in claim 9, wherein:
the generating of the final brew includes: pressurizing a second pressure chamber at a fourth pressure using a first gas for a fourth duration; depressurizing the second pressure chamber; and decanting final brew into a plurality of containers.

11. A method for batch production of an espresso coffee, comprising:
preparing a mixture of ground coffee and water in a pressure chamber;
sealing and pressurizing the pressure chamber to degas the ground coffee in the pressure chamber;
extracting an initial brew from the degassed ground coffee using a first inert gas to pressurize the pressure chamber;
depressurizing the pressure chamber;
filtering the initial brew; and
repressurizing the pressure chamber using second inert gas to generate a final brew from the filtered initial brew.

12. The method for batch production of the espresso coffee as set forth in claim 11, wherein:
the first and the second inert gases are argon.

13. A method for batch production of an espresso coffee, comprising:
preparing a mixture of ground coffee and water in a pressure chamber;
degassing the ground coffee in the pressure chamber by pressurizing the pressure chamber with a first gas;
depressurizing the pressure chamber;
extracting an initial brew from the degassed ground coffee by pressurizing the pressure chamber with a second gas;
depressurizing the pressure chamber;
flavoring the initial brew to generate a flavored initial brew by pressurizing the pressure chamber with a third gas;
depressurizing the pressure chamber;
filtering the flavored initial brew; and
producing a final brew from the filtered flavored initial brew by pressurizing the pressure chamber with a fourth gas.

14. The method for batch production of the espresso coffee as set forth in claim 13, wherein:
the first, the second, and fourth gases are inert gases.

15. The method for batch production of the espresso coffee as set forth in claim 13, wherein:
the third gas is Nitrogen.

* * * * *